United States Patent [19]

Sindelar

[11] 4,189,287
[45] Feb. 19, 1980

[54] BACK-UP RING FOR CUP SEAL

[75] Inventor: Ernest C. Sindelar, Aurora, Ill.

[73] Assignee: Caterpillar Tractor Co., Peoria, Ill.

[21] Appl. No.: 804,974

[22] Filed: Jun. 9, 1977

[51] Int. Cl.² ................... F04B 39/10; F04B 7/04
[52] U.S. Cl. ................................... 417/490; 417/493
[58] Field of Search ............ 417/555, 490, 493, 511; 92/129, 135

[56] References Cited

U.S. PATENT DOCUMENTS

| 1,333,211 | 3/1920 | Moss | 417/490 |
| 2,197,125 | 4/1940 | Cox | 92/31 |
| 2,656,680 | 10/1953 | Brunner | 92/135 |
| 3,800,541 | 4/1974 | Sindelar | 417/511 |
| 4,066,153 | 1/1978 | Plentz | 92/129 |

FOREIGN PATENT DOCUMENTS

| 722383 | 12/1931 | France | 417/550 |
| 1232894 | 5/1968 | United Kingdom | 417/555 |

Primary Examiner—William L. Freeh
Attorney, Agent, or Firm—Phillips, Moore, Weissenberger, Lempio & Majestic

[57] ABSTRACT

A brake cylinder includes a housing within which a piston is reciprocable, such piston acting on a cup seal. An annular resilient member of, for example, polyurethane material, is interposed the outer periphery of the cup seal and the adjacent outer periphery of the piston, and cooperates with such piston to engage the inner surface of the bore to prevent any portion of the seal being pinched between a portion of the piston and the inner surface of the bore.

7 Claims, 5 Drawing Figures

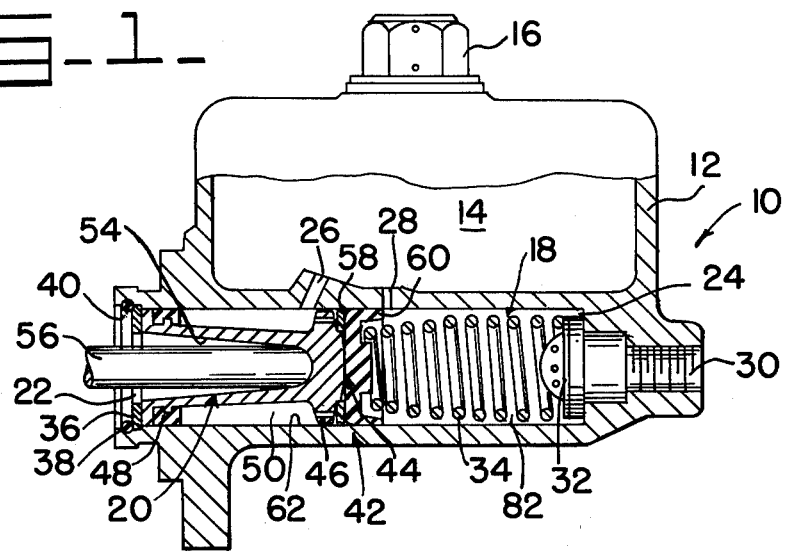
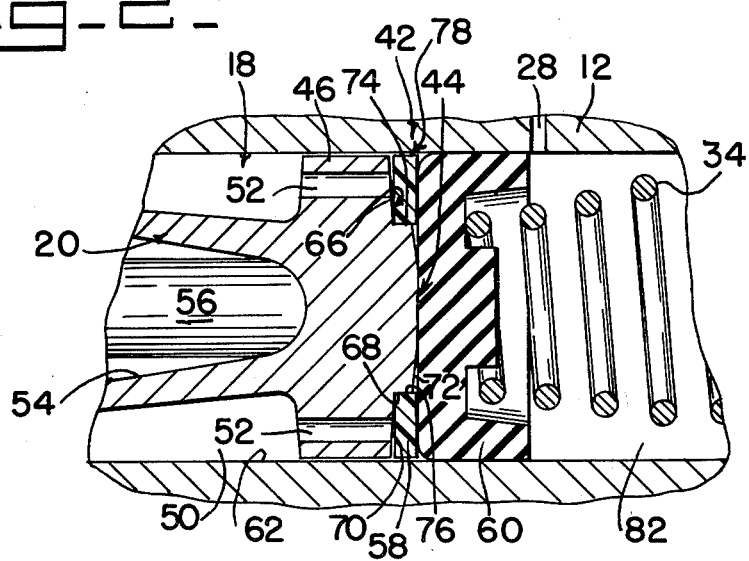
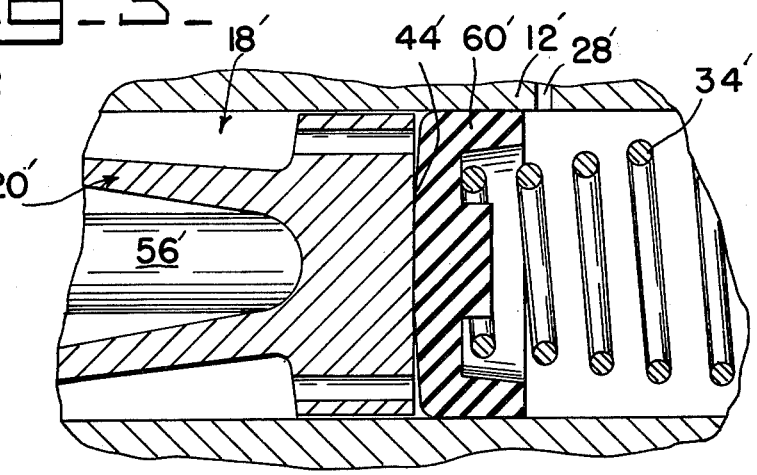

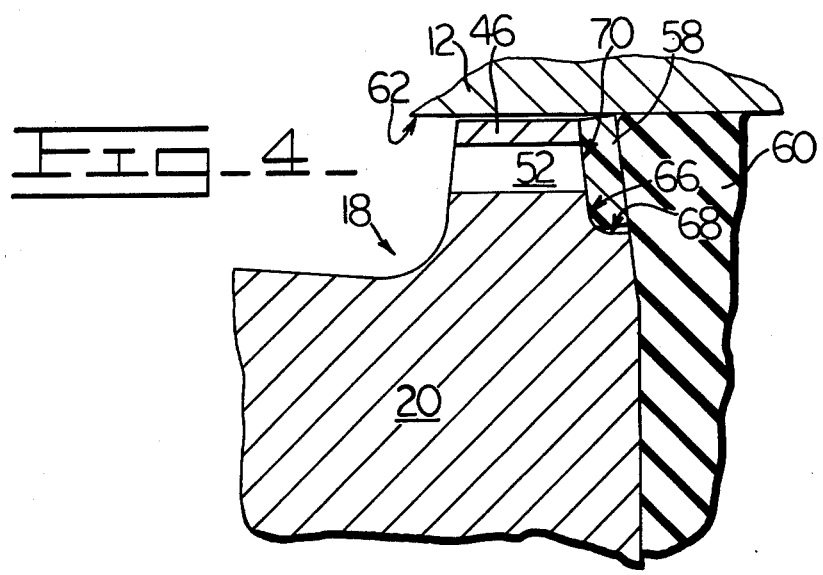
Fig-4
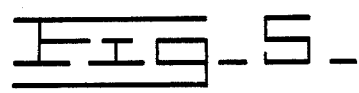
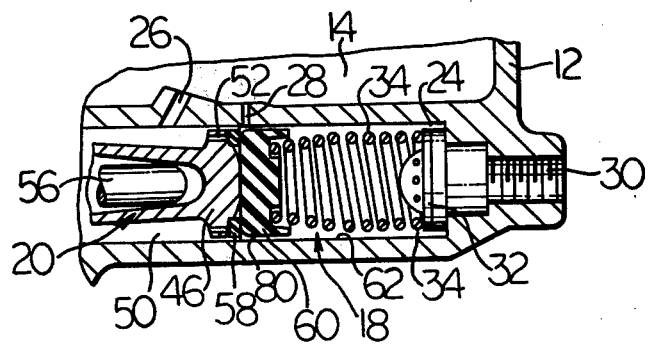

BACK-UP RING FOR CUP SEAL

BACKGROUND OF THE INVENTION

This invention relates to pumping apparatus, and more particularly, to the sealing apparatus of a master cylinder or the like.

In a pumping device such as a master cylinder, it is well known to include a piston movable to in turn move a cup seal to apply pressure to brake a vehicle. It is generally true that the outer periphery of the piston and the inner periphery of the bore define a slight clearance therebetween, and with such piston acting directly on the cup seal, it is possible over a relatively long period of operation for a portion of the cup seal to be "chewed" between such outer periphery of the piston and the inner surface of the bore, resulting in damage to said cup seal. This is particularly true as the cup seal is moved by movement of the piston past a housing port communicating with the bore, as is also well known.

Of general interest in this area are U.S. Pat. No. 1,889,987 to Heidloff, U.S. Pat. No. 2,254,937 to Dick, U.S. Pat. No. 2,656,680 to Brunner, and U.S. Pat. No. 3,391,646 to Schlosser.

SUMMARY OF THE INVENTION

Accordingly, it is an object of this invention to provide a master cylinder arrangement or the like wherein piston movement is utilized to in turn move a cup seal and wherein the problem of "chewing" of the outer periphery of the cup seal between the outer periphery of the piston and the inner surface of the bore is avoided.

It is a further object of this invention to provide a master cylinder or the like which, while fulfilling the above objects, is extremely simple in design and effective in use.

Broadly stated, the invention is in a pump having a housing defining a bore within which a piston is movable to move the front face thereof to define a pumping and a non-pumping state. The invention comprises an annular resilient member disposed within the bore adjacent the front face of the piston. Elastomeric seal means are disposed within the bore to contact the inner periphery of the bore, to be moved upon movement of the piston defining a pumping state. The outer periphery of the annular resilient member is spaced from the inner periphery of the bore to define an annular gap therewith, with the piston in a non-pumping state. The outer periphery of the elastomeric seal means is disposed adjacent the annular resilient member. Means are included for providing that the outer periphery of the annular resilient member is brought into substantially continuous annular contact with the inner surface of the bore with the piston in a pumping state, the substantially continuous annular contact occurring adjacent the area of contact of the elastomeric seal means and inner periphery of the bore.

BRIEF DESCRIPTION OF THE DRAWINGS

These and other objects of the invention will become apparent from a study of the following specification and drawings, in which:

FIG. 1 is a longitudinal vertical section taken through a master cylinder embodying the present invention, with the components thereof shown in a static position;

FIG. 2 is an enlarged view of a portion of the apparatus shown in FIG. 1;

FIG. 3 is a view similar to that shown in FIG. 2 but showing a prior art system;

FIG. 4 is a view similar to that shown in FIG. 2, but showing the disposition of certain components during the piston pumping state;

FIG. 5 is a fragmentary section of the master cylinder of FIG. 1 showing the disposition of certain components during a return stroke of the piston.

DESCRIPTION OF THE PREFERRED EMBODIMENT

A pump in the form of a hydraulic cylinder is shown generally at 10. The hydraulic cylinder 10 may actually be the master cylinder of a brake system having a brake pedal (not shown) and a plurality of individual wheel cylinders (not shown). The master cylinder 10 includes a housing 12 which defines a reservoir 14 adapted to contain a supply of fluid which is introduced thereto through the cap fitting 16. The housing 12 defines a bore 18 within which a piston 20 is movable. The bore 18 has an open end 22 and an outlet end 24. The bore 18 can communicate with the reservoir 14 through a makeup port 26 and through a compensating port 28. The compensating port 28 is located between the makeup port 26 and the outlet end 24 of the main bore 18. The housing has a threaded outlet port 30 at the outlet end 24 of the bore 18 which communicates with the individual brake cylinders.

A conventional flapper type check valve 32 is disposed inwardly adjacent the outlet port 30 and is retained in such position by a spring 34 as shown. The check valve 32 allows an unrestricted flow therethrough in a direction toward the outlet port 30 and blocks the flow of fluid therethrough in a reverse direction. Subsequently, the fluid returning from the wheel cylinders move the check valve 32 away from the outlet end 24 enabling the fluid to bypass the check valve 32. In this manner, check valve 32 maintains a residual pressure at 30, based on the force exerted by spring 34.

As set forth above, the piston 20 is slidably disposed within the bore 18, and is retained therein by a retainer 36 and snap ring 38, which ring resides in a groove 40. A piston sealing arrangement 42 is associated with the front face 44 of the piston 20, and the spring 34 is effective to urge the piston sealing arrangement 42 and piston 20 toward the open end 22 of the main bore 18. The piston 20 has a flange portion 46 at one end thereof which abuts the sealing arrangement 42. A seal 48 at the opposite end of the piston 20 assures the retention of a supply of fluid in an annular chamber 50 defined within the bore 18 between the seal 48 and the piston flange portion 46. A plurality of passages 52 extend through the piston flange portion 46 and communicate fluid from the makeup port 26 and chamber 50 to the piston sealing arrangement 42. A tapered recess 54 is formed within the piston 20 to receive one end of a force rod 56 which has an outer opposite end (not shown) which is adapted for connection to a brake pedal or the like in the usual manner.

The piston sealing arrangement 42 includes an annular resilient member 58 which may take the form of, for example, a polyurethane ring, such annular resilient member 58 being disposed within the bore 18 adjacent the front face 44 of the piston 20. The piston sealing arrangement 42 further includes elastomeric seal means in the form of a sealing cup member 60, disposed within the bore 18 to contact the inner surface 62 of the bore 18.

The piston 20 defines tapered surface means 66 adjacent the front face 44 thereof, such tapered surface means 66 being tapered rearwardly outwardly relative to the face 44 of such piston 20, and adjacent the outer periphery thereof. Such tapered surface means 66 comprise a curved annular surface portion 68 and a conically-shaped annular surface portion 70 outwardly of and extending from such curved annular surface portion 68. The conically-shaped annular surface portion 70 is angled substantially 6° from a plane transverse of the longitudinal axis of the bore 18. The face 44 of the piston 20 defines a conically-shaped annular surface 72, which is also angled substantially 6° from a plane transverse of the longitudinal axis of the bore 18, and tapered outwardly rearwardly of such face 44. The conically-shaped annular surfaces 70,72 are connected by a cylindrical surface 74 on which the inner bore 76 of the annular resilient member 58 is force-fitted so as to be held thereon relative to the piston 20. The outer periphery of the selaing cup member 60 is adjacent the annular resilient member 58 as shown. The annular resilient member 58 is sized so that, with the hydraulic cylinder 10 in its non-pumping or static state as shown in FIG. 1, the inner periphery of the annular resilient member 58 is seated on the cylindrical surface 74, and the outer periphery of the annular resilient member 58 is spaced from the inner surface 62 of the bore 18 to define an annular gap 78 therewith. Also, with the hydraulic cylinder 10 in such static state, the leading edge of the cup sealing member 58 is disposed rearwardly of the compensating port 28, thus allowing communication between the reservoir 14 and the spring chamber portion of the main bore 18.

Upon movement of the piston 20 so that the front face 44 thereof defines a pumping state, the initial piston movement seals off the compensating port 28 and subsequent movement pumps the fluid through the outlet end 24 of the main bore 18, past the check valve 32 and port 30 to the wheel cylinders to pressurize the fluid therein. During such pumping action, the outer periphery of the cup sealing member 60, forced leftwardly relative to the piston 20 (see FIG. 4), forces the annular resilient member 58 against the conically-shaped annular surface 70 to bear thereagainst, blocking the passages 52 to thereby block communication between the area forward of the piston 20 and the area rearward of the piston 20. Additionally, such rearward forcing of the annular resilient member 58 forces the curved annular surface portion 68 to act on the inner periphery of the annular resilient member 58, and through such urging by the curved annular surface portion 68 and the angling of the conical surface portion 70, the outer periphery of the annular resilient member 58 is brought into substantially continuous annular contact with the inner surface 62 of the bore 18 (FIG. 4). Because of such annular contact of the resilient member 58 with inner surface 62 of the bore 28 the outer periphery of the cup sealing member 60 is protected from being squeezed and pinched between the outer surface of the piston 44 and the inner surface 62 of the bore 10, which would take place in, for example, the prior art system shown in FIG. 3. Such "chewing" over a period of time of operation results in damage to and eventual failure of the cup seal 60'. Such problem is completely avoided in the present system because of the particular structure of the annular resilient member 58, and structure associated therewith.

Returning to the operation of the hydraulic cylinder 10, upon release of the actuating force on the rod 56, the spring 34 is effective to move the cup seal 60, annular resilient member 58, and piston 20 toward the open end 22 of the bore 18. Since the check valve 32 blocks the flow of fluid therethrough in a reverse direction, the pressurized fluid forces the check valve 32 away from the outlet port 30 of the bore 18 against the bias of the spring 34 to enable the fluid in the wheel cylinders to bypass the check valve 32 and return to the bore 18.

Due to the check valve 32 restricting the flow of fluid from the wheel cylinders back into the outlet end of the bore 18, there is a propensity for the creation of a vacuum therein. This condition is sensed through the annular clearance 80 around the cup seal member 60. Due to this vacuum there is a pressure differential between the spring chamber 82 and the chamber 50. In such state, as shown in FIG. 5, the annular resilient member 58 has been allowed to adopt its initial state, wherein the annular gap 78 is defined between the outer periphery of the annular resilient member 58 and the inner surface 62 of the bore 18. High pressure fluid is thus transmitted through the passages 52 and annular gap 78 and the annular clearance 80 to the spring chamber 82. The cross sectional area of the annular gap 78 is chosen to be substantially equal to the total cross sectional area of the passages 52, so that generally continuous and proper transmission of high pressure fluid is provided.

When the piston sealing arrangement 42 and the piston 20 again reach their inoperative or static position, as shown in FIG. 1, the bias in the spring 34 forces the cup sealing member 60 against the face 44 of the piston 20, thereby once again sealing off communication between the aforementioned chambers. Any excess fluid residing in the spring chamber 82 of the bore 18 and the brake line is transmitted to the reservoir through the compensating port 28.

The embodiments of the invention in which an exclusive property or prililege is claimed are defined as follows:

1. In a pump having a housing defining a bore within which a piston is movable to move a front face thereof to define a pumping and a non-pumping state;
   an annular resilient member disposed within said bore adjacent the front face of the piston;
   elastomeric seal means disposed within said bore to contact the inner periphery of the bore, to be moved upon movement of the piston defining a pumping state;
   the outer periphery of the annular resilient member being spaced from the inner periphery of the bore to define an annular gap therewith, with the piston in a non-pumping state;
   the outer periphery of the elastomeric seal means being adjacent to the annular resilient member; and
   means for providing that the outer periphery of the annular resilient member is brought into substantially continuous annular contact with the inner surface of the bore with the piston in a pumping state, said substantially continuous annular contact occuring adjacent the area of contact of the elastomeric seal means and inner periphery of the bore, wherein the means for providing that the outer periphery of the annular resilient member is brought into substantially continuous annular contact with the inner periphery of the bore comprises a tapered surface defined by the piston adjacent the face thereof, tapered rearwardly outwardly relative to the face, said tapered surface bearing against the annular resilient member to force the outer periphery thereof against the inner periphery of the bore with the piston in a pumping state.

2. The pump of claim 1 wherein the tapered surface comprises a curved annular surface portion and a conically shaped annular surface portion outwardly of and extending from said curved annular surface portion.

3. The pump of claim 2 wherein the piston defines passage means providing communication between the area forward of the piston and the area rearward of the piston, the annular resilient member blocking said passage means with the conically shaped annular surface portion bearing against the annular resilient member.

4. The pump of claim 3 wherein the cross-sectional area of the annular gap between the outer periphery of the annular resilient member and the inner periphery of the bore, with the piston in said non-pumping state, is substantially equal to the cross-sectional area of the passage means.

5. The pump of claim 4 wherein the passage means are defined through the piston.

6. In a pump having a housing defining a bore within which a piston is movable to move a front face thereof to define a pumping and a non-pumping state;
    piston sealing means disposed within said bore adjacent the front face of the piston;
    the piston sealing means allowing fluid flow therepast to the piston with a piston in a non-pumping state;
    the piston defining passage means providing communication between the area forward of the piston and the are rearward of the piston, through which fluid may flow with the piston in a non-pumping state, wherein the piston sealing means comprise an annular resilient member disposed within said bore adjacent the front face of the piston, and elastomeric seal means disposed within said bore to contact the inner periphery of the bore, to be moved upon movement of the piston defining a pumping state, the outer periphery of the annular resilient member being spaced from the inner periphery of the bore to define an annular gap therewith, with the piston in a non-pumping state.

7. The pump of claim 6 wherein the cross-sectional area of the annular gap between the outer periphery of the annular resilient member and the inner periphery of the bore, with the piston in said non-pumping state, is substantially equal to the cross-sectional area of the passage means.

* * * * *